United States Patent [19]
Nelson et al.

[11] Patent Number: 5,884,084
[45] Date of Patent: Mar. 16, 1999

[54] CIRCUIT AND METHOD FOR USING EARLY RESET TO PREVENT CMOS CORRUPTION WITH ADVANCED POWER SUPPLIES

[75] Inventors: Albert Rudy Nelson; Irfan Syed, both of Hillsboro; Joseph Manaloor, Portland, all of Oreg.

[73] Assignee: Intel Corporation, Santa Clara, Calif.

[21] Appl. No.: 742,116

[22] Filed: Oct. 31, 1996

[51] Int. Cl.⁶ ........................................... G06F 1/26
[52] U.S. Cl. ..................... 395/750.01; 365/228
[58] Field of Search ................... 365/226–229; 395/750.01

[56] References Cited

U.S. PATENT DOCUMENTS

| | | | |
|---|---|---|---|
| 4,145,761 | 3/1979 | Gunter et al. | 365/227 |
| 4,631,707 | 12/1986 | Watanabe | 365/226 |
| 4,669,066 | 5/1987 | Kagawa et al. | 365/229 |
| 5,016,219 | 5/1991 | Nolan et al. | 365/195 |
| 5,283,792 | 2/1994 | Davies, Jr. et al. | 371/66 |
| 5,345,590 | 9/1994 | Ault et al. | 395/406 R |
| 5,375,246 | 12/1994 | Kimura et al. | 365/229 |
| 5,410,713 | 4/1995 | White et al. | 395/750.07 |
| 5,546,589 | 8/1996 | Odaira | 395/750.08 |
| 5,594,686 | 1/1997 | Hazen et al. | 365/185.04 |

*Primary Examiner*—Meng-Ai T. An
*Assistant Examiner*—Sumati Lefkowitz
*Attorney, Agent, or Firm*—Blakely, Sokoloff, Taylor & Zafman LLP

[57] ABSTRACT

The reset circuit including a logic gate coupled to an electrical component containing the CMOS memory. The logic gate includes an output and at least a first and second inputs. The first input is configured to receive a first signal indicating that a power-down sequence has been requested. The second input, however, is configured to receive a second signal being a system reset signal. As a result, during a power-down sequence, CMOS memory is precluded from being accessed almost immediately after the first signal has been deactivated while other devices are powered-down in a normal fashion.

34 Claims, 5 Drawing Sheets

CIRCUIT AND METHOD FOR USING EARLY RESET TO PREVENT CMOS CORRUPTION WITH ADVANCED POWER SUPPLIES

BACKGROUND OF THE INVENTION

1. Field of the Invention

The present invention relates to the field of power management. More particularly, the present invention relates to a circuit and method for preventing corruption of CMOS memory during a power-down sequence.

2. Description of Art Related to the Invention

For many years, power supplies have been installed into a majority of personal computers ("PCs") in order to convert power from a wall socket into a power level used by one or more printed circuit boards implemented within the PC. For less advanced power supplies, the supply of power has been controlled by hardware-initiated, power-down sequences commenced by manually depressing a button or switch protruding from the casing of the PC. When turned on, the power supply provides a steady direct current ("DC") voltage to the printed circuit board. This DC voltage, referred to as "$V_{cc}$", is usually 5 volts. When turned off, however, the power supply switches to provide a standby voltage ("$V_{(stby)}$") with a minimal amount of current (e.g., typically 10 milliampères "ma"), which provides sufficient power to support various electrical components requiring power at all times.

Independent of the type of power supply implemented within the PC, a battery may be added to the printed circuit board to provide a backup voltage (referred to as "$V_{bat}$"). This battery may be necessary in order to provide power to the electrical components in the event that the power supply is disconnected from the wall socket. Examples of such electrical components include a real time clock and battery-backed CMOS random access memory as discussed below.

Typically, a volatile memory element is implemented within the PC in order to store system configuration information. This volatile memory element is usually memory fabricated through a Complementary Metal-Oxide Semiconductor ("CMOS") process (hereinafter referred to as "CMOS memory"). Typically, CMOS memory requires very low power and is contained in a Super Input/Output ("SIO") component. CMOS memory must always remain powered to avoid loss of its stored content which are always checked during power-up. Therefore, CMOS memory switches between $V_{bat}$, $V_{(stby)}$ and $V_{cc}$ depending on the current state of the power supply.

Unlike less advanced power supplies, emerging power supplies are being designed with the ability of receiving a control signal from one of the printed circuit boards in the PC, such as the motherboard, to turn on or off the power supply. Examples of the emerging power supplies include, but are not limited to ATX and LPX power supplies which have different connectors. These power supplies enable the PC to support advanced power management software, advanced power supply control software and other widely available power management software which, initiates a software-controlled, power-down sequence.

Currently, during a power-down sequence by the PC, the SIO component is configured to prevent access to its CMOS memory after receipt of an active system RESET signal derived from the power supply. This access prevention technique can be enhanced significantly in those cases where CMOS memory may be accessed after the printed circuit board has initiated a power-down sequence, but before the active system RESET signal has been received by the SIO component. CMOS memory corruption is likely to occur during the power-down sequence. CMOS memory corruption is most troublesome at motherboard manufacture when numerous power-down and power-up sequences are being performed.

The disadvantages of CMOS corruption are self-evident in increased manufacturing costs to temporarily correct printed circuit boards found to be defective. For those printed circuit boards that are not found to be defective, there is a possibility that PC users may occasionally experience CMOS corruption requiring reconfiguration for his or her PC. These problems can increase the cost of a product unnecessarily.

Thus, it would be advantageous to provide a circuit and technique that prevents access to the CMOS memory as early as possible in the power-down sequence to prevent CMOS memory corruption.

BRIEF SUMMARY OF THE INVENTION

The present invention relates to a reset circuit and corresponding method for preventing corruption of CMOS memory implemented within an electrical component. As described herein, the reset circuit features a logic gate coupled to the electrical component. The logic gate includes an output and at least a first and second inputs. The first input is configured to receive a signal indicating that a power-down sequence has been requested, causing the output of the logic gate to go active. As a result of receiving the active output signal from the logic gate, the electronic component precludes access to CMOS memory almost immediately after the signal has been received.

BRIEF DESCRIPTION OF THE DRAWINGS

The features and advantages of the present invention will become apparent from the following detailed description of the present invention in which.

DETAILED DESCRIPTION OF THE INVENTION

The present invention describes a circuit and method for preventing, during a power-down sequence, corruption of the contents of a CMOS memory implemented within an electronic system. As discussed herein, an "electronic system" is hardware implemented with one or more printed circuit boards that support software-initiated power-down sequences. Examples of an electronic system may include, but are not limited to, a desktop or portable computer, printer, as well as consumer and professional electronic equipment. The term "active" and all tenses associated therewith indicate a state level of logic "1" or logic "0" for an active-low signal. Likewise, the terms "inactive" or "deactivate" indicate a state level of logic "0" or logic "1" for active-low signals.

The following detailed description is presented largely in terms of block and timing diagrams which are considered to be the most effective way to convey the substance of the present invention to those persons of ordinary skill in the art in electronics. However, it is apparent to one skilled in the art that the specific details, including whether certain signals need to be active or inactive as set forth below, are not required to practice the invention.

Figure 1:
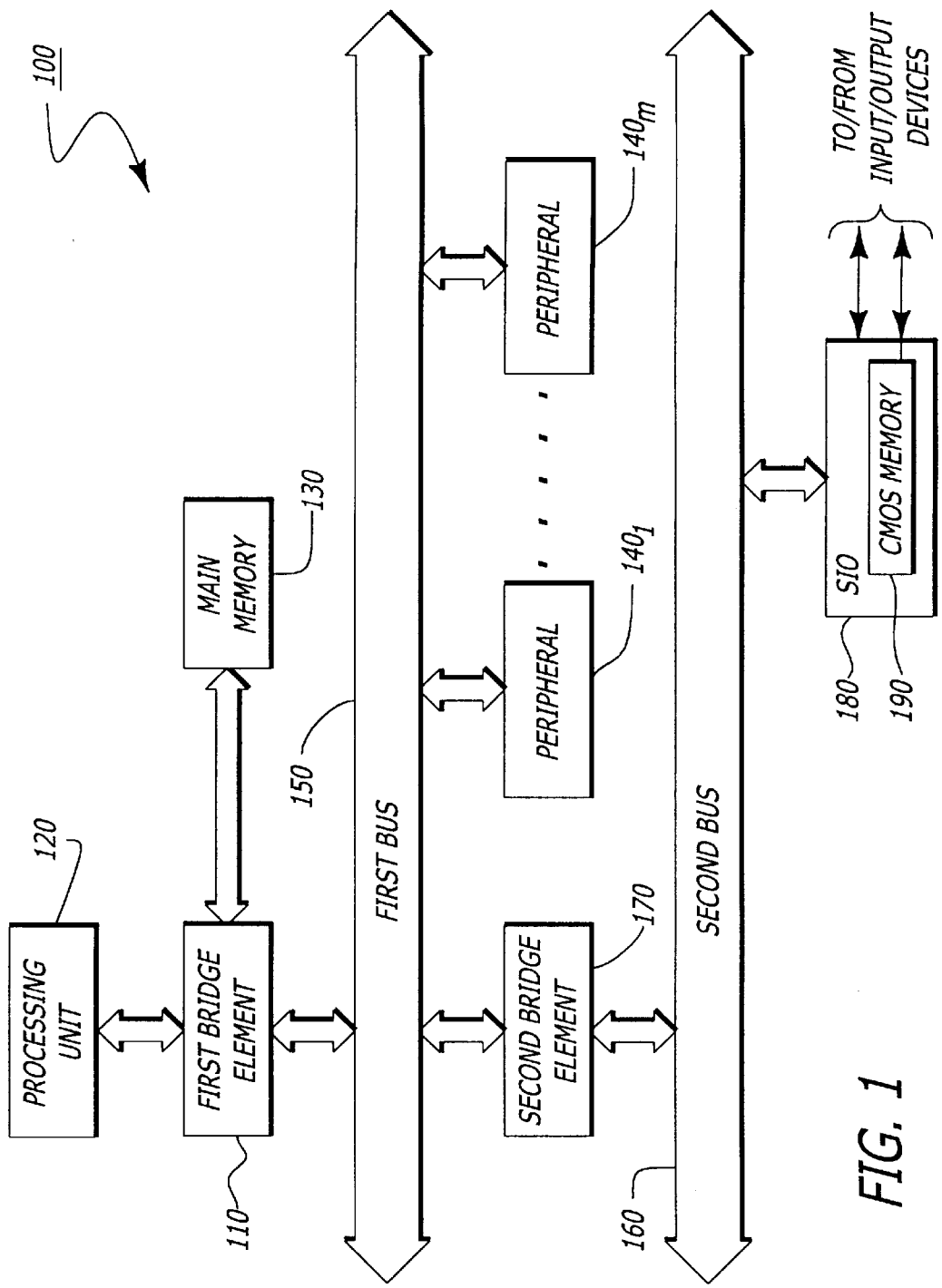
FIG. 1 is an illustrative block diagram of an electronic system employing CMOS memory within a SIO component to store information pertaining to the configuration of the electronic system.

Referring to FIG. 1, a general block diagram of the electronic system implemented with the present invention is shown. The electronic system 100 includes a first bridge element 110 (e.g., Host-to-PCI controller) providing a communication path between a processing unit 120, main memory 130 and "m" peripherals $140_1$–$140_m$ ("m" being a positive whole number) coupled to a first bus 150. The first bus 150 may include, but is not limited to, a Peripheral Component Interconnect ("PCI") bus. The peripherals $140_1$–$140_m$ may include one or more graphics card(s), a local area network ("LAN") card and other cards coupled to the PCI bus (into PCI bus slots not shown) to provide additional functionality.

The electronic system 100 may further include a second bus 160 acting as an I/O bus (e.g., an Industry Standard Architecture "ISA" bus). The second bus 160 may be coupled to the first bridge element 110 or a second bridge element 170 (e.g., PCI-to-ISA controller like PIIX™) as shown. In addition, the second bus 160 may further interconnect various I/O peripherals together, including a SIO component 180 as shown. The SIO component 180 is coupled to a number of input or output devices, some of which may include a printer through a parallel port; a keyboard or cursor control device (e.g., mouse, trackball, touch pad, joystick, etc.) through a communication port and the like.

As shown, the SIO component 180 may include volatile memory, such as CMOS memory 190, to contain information regarding the configuration of the electronic system 100. Such system configuration information may include, but is not limited to, memory size, memory type, type of monitor, printer configuration, storage media configuration, speaker volume levels, mouse sensitivity and other system-related information. However, it is contemplated that the CMOS memory is not required to be implemented within the SIO component 180, but may be implemented within the second bridge element 170, within any other integrated circuit of the electronic system 100 or within a power supply of the electronic system 100.

During a power-up sequence, the electronic system 100 undergoes a boot procedure in which its BIOS checks the contents of CMOS memory 190 against the current dedicated system configuration. BIOS also compared CMOS values for agreement with a previously stored checksum. The electronic system 100 may issue a system error requiring the user to appropriately modify the contents of CMOS memory 190 or allow BIOS to automatically perform such modifications.

Figure 2:
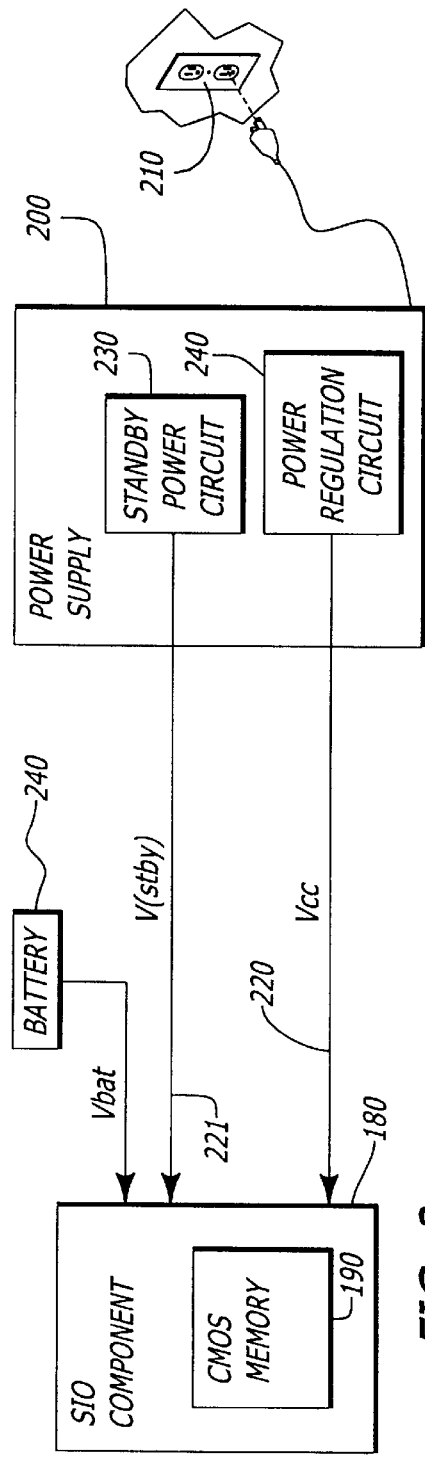
FIG. 2 is an illustrative embodiment of a power distribution architecture used to supply power to the CMOS memory.

Referring now to FIG. 2, a general block diagram of a power distribution system utilized by CMOS memory 190 is shown. SIO component 180, containing CMOS memory 190, receives power from one of three alternative power sources. A first power source is a power supply 200 receiving power from a wall socket 210. If the power supply 200 is turned on, a power regulation circuit 240 regulates voltage alternating current provided by the wall socket 210 into a DC voltage. The DC voltage is supplied to the SIO component 180 through a first power line 220. In the event that the power supply 200 is not turned on, a standby power circuit 230 is configured to supply a standby voltage "$V_{(stby)}$" and a small amount of current (approximately 10 ma) to the SIO component 180 via a second power line 221. Alternatively, if the power supply 200 is disconnected from the wall socket 210, a battery 250, implemented on-board or off-board, supplies a voltage $V_{bat}$ to the SIO component 180 in order to supply sufficient power so that the stored contents of CMOS memory 190 will not be lost.

Figure 3:
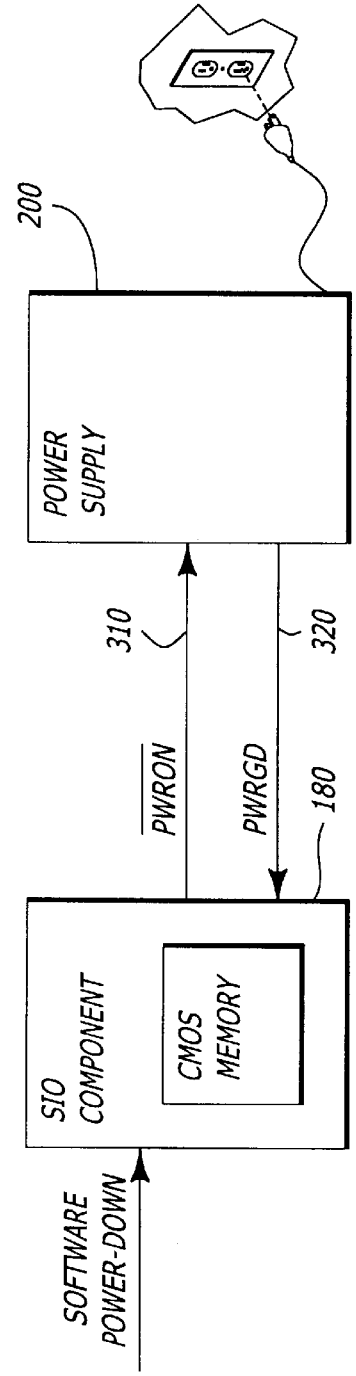
FIG. 3 is an illustrative embodiment of the control signals transmitted between a component containing the CMOS memory and the power supply to perform a power-down sequence upon receipt of a software-driven power down signal.

Referring to FIG. 3, a general block diagram is used in order to illustrate control communications between the power supply 200 and the SIO component 180 in order for the printed circuit board featuring the SIO component 180 to instruct the power supply 200 to begin a power-down sequence. The control communications are similar for both software-initiated, power-down sequences as well as hardware-initiated, power-down sequences. The only difference is the manner in which the power-down sequences are initiated (e.g., execution of one or more management instruction(s) versus depression of a power on/off button, respectively).

Upon the processing unit initiating a power-down command to be read by SIO component 180 or depressing a power on/off button, the SIO component 180 responds by transmitting a power on ("$\overline{\text{PWRON}}$") control signal through a first power supply interconnect line 310. The $\overline{\text{PWRON}}$ signal, when inactive, indicates that the electronic system is to begin its power-down sequence.

Upon receiving the inactive $\overline{\text{PWRON}}$ signal and after a predetermined delay, the power supply 200 deactivates a power good ("PWRGD") control signal transmitted over line 320 which causes activation of a system RESET signal. Due to the predetermined delay between deactivation of the $\overline{\text{PWRON}}$ signal and the PWRGD signal, prior systems may occasionally incur corruption of the CMOS memory 190 through errant overwriting of information within the CMOS memory 190. The present invention, however, does not rely on the deactivation of the PWRGD signal. CMOS memory 190 is protected upon deactivation of the $\overline{\text{PWRON}}$ signal during both types of power-down sequences, namely hardware-initiated and software-initiated.

Figure 4:
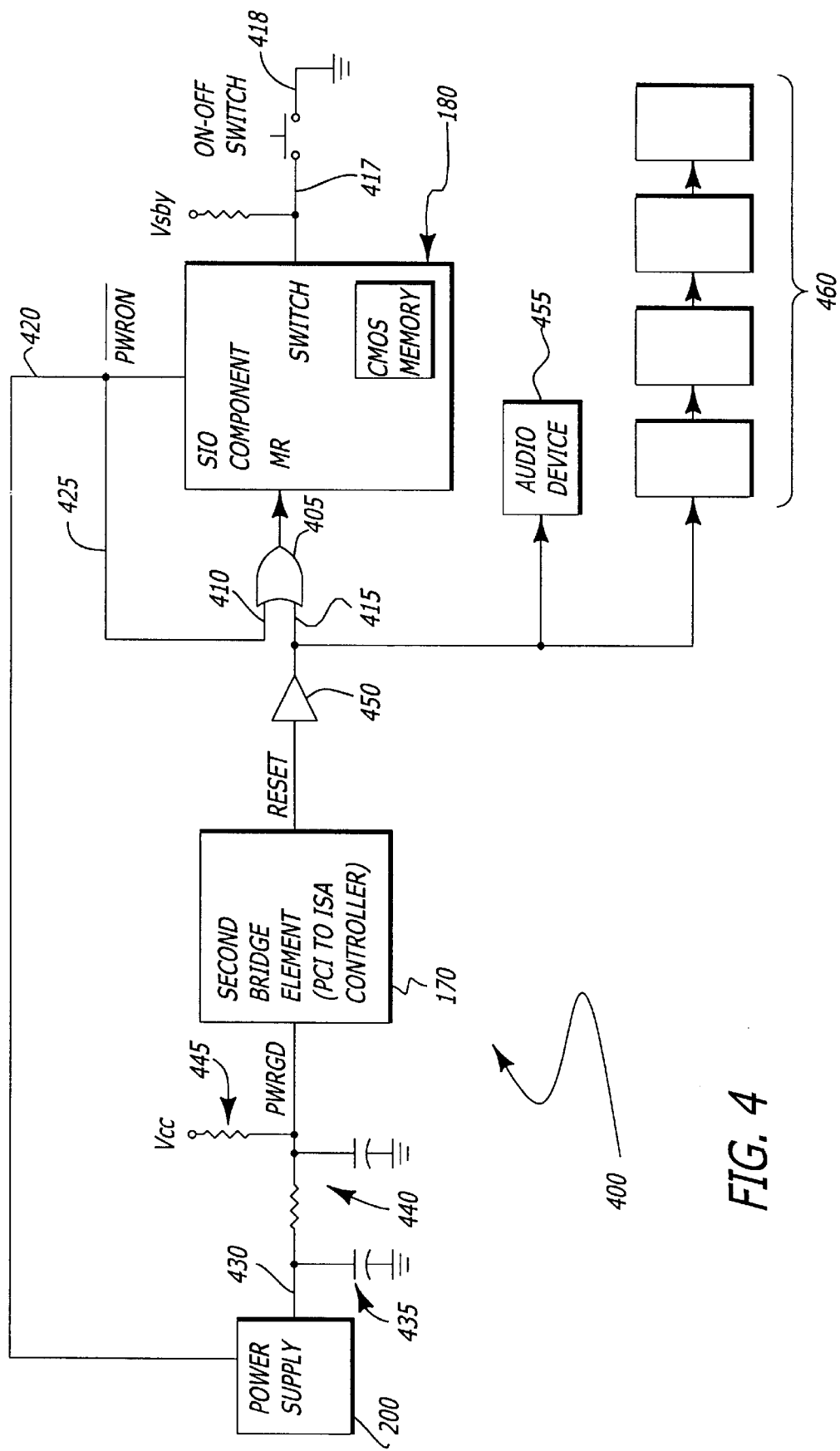
FIG. 4 is a more-detailed embodiment of reset circuitry used to prevent CMOS corruption during the power-down sequence of FIG. 3.

Referring now to FIG. 4, reset circuitry 400 is used to prevent access to the CMOS memory during the period between deactivation of the $\overline{\text{PWRON}}$ signal and deactivation of the PWRGD signal. An important feature of the reset circuitry 400 is the inclusion of a logic gate 405 having its output coupled to a memory reset input ("MR") of the SIO component 180. The logic gate 405 operates as a multiple-input OR gate in which a first input 410 is coupled to receive the $\overline{\text{PWRON}}$ signal while a second input 415 is coupled to receive a system RESET signal. This allows the SIO component 180 to be reset upon deactivation of the $\overline{\text{PWRON}}$ signal to prevent CMOS corruption problems found in conventional electronic systems while allowing other components (e.g., ISA slots) to be reset under normal conditions.

As shown, after the SIO component 180 deactivates the $\overline{\text{PWRON}}$ signal upon receipt of a power-down command via a system bus or detects connection of the power on/off switch 416 to lines 417 and 418, the SIO component 180 transmits the $\overline{\text{PWRON}}$ signal to the power supply 200 through signal line 420 and to the logic gate 405 through feedback line 425. The deactivated $\overline{\text{PWRON}}$ signal causes the power supply 200 to deactivate the PWRGD signal. The PWRGD signal is routed to the second bridge element 170 through signal line 430. Such deactivation occurs after a delay ranging from 5 ms to 20 ms or even longer. A first capacitor 435 is placed on the signal line 430 to reduce emissions and a resistor-capacitor ("RC") network 440 is placed connected to the signal line 430 to control the rise and fall time of the PWRGD signal. A pull-up resistor 445 is used to eliminate signals floating on the signal line 430.

Upon receiving the PWRGD signal from the power supply 200, the second bridge element 170 generates the system RESET signal and outputs that signal to a driver 450. The driver 450 may drive the system RESET signal to the logic gate 405 as well as other devices such as an audio device 455, ISA slots 460 and the like. It is contemplated, however, that altering the placement of CMOS memory would change the architecture of the reset circuitry 400, but it would not change the fact that the CMOS memory, where implemented, would require notice of the deactivation of the $\overline{\text{PWRON}}$ signal with minimal delay.

Figure 5:
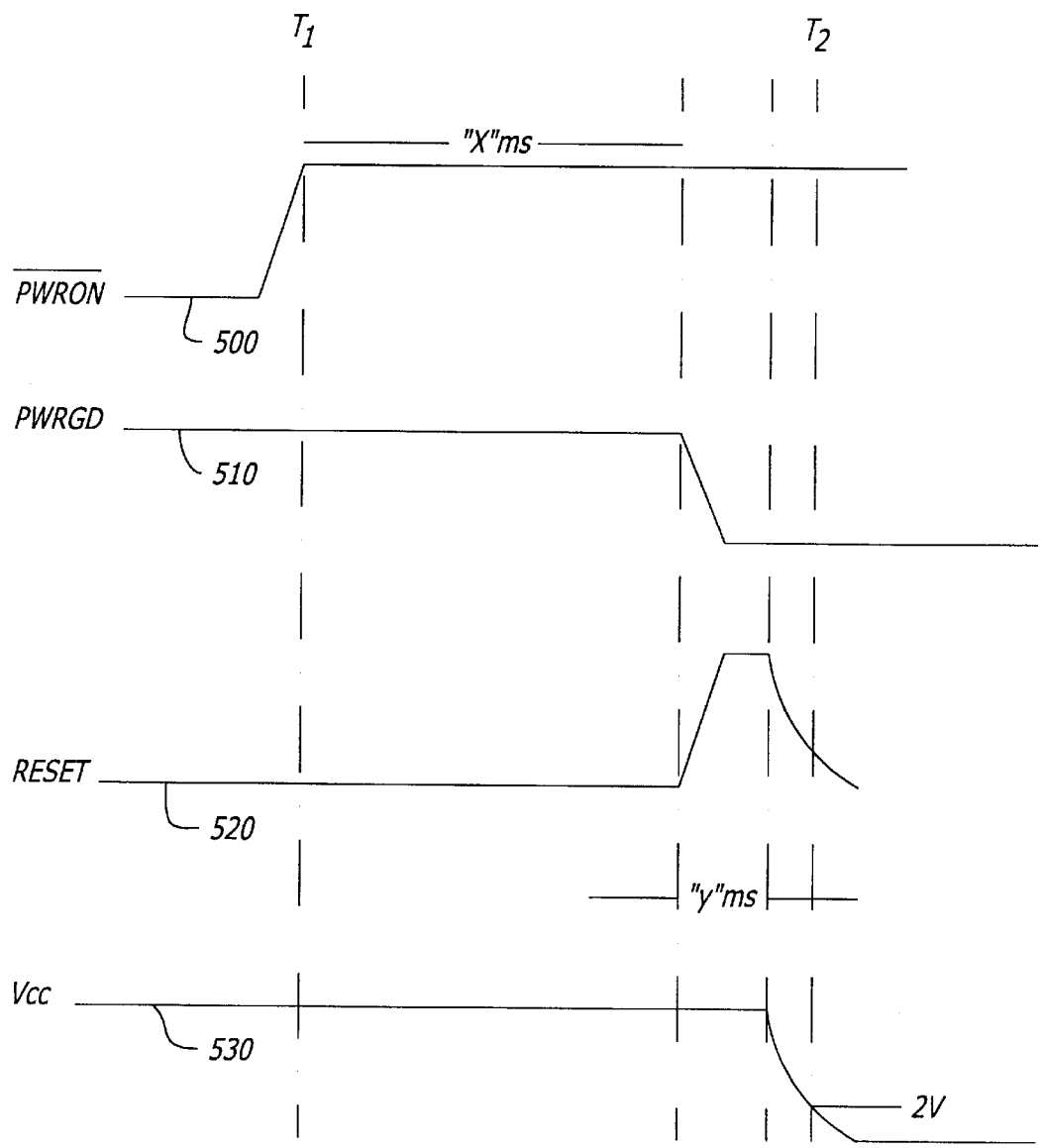
FIG. 5 is a timing diagram of the control signals used by the electronic system of FIG. 3 to perform a power-down sequence.

Referring now to FIG. 5, a timing diagram of the control signals used for completing a power-down sequence to avoid CMOS corruption within any electronic system is shown. Upon deactivation of the $\overline{\text{PWRON}}$ signal 500, a substantial delay occurs before the PWRGD signal 510 is deactivated. The delay has been measured to be equal to "x", where "x" is a time delay greater than 5 ms and often around 20 ms as shown. However, the precise delay will vary for different power supplies, component tolerances and the like. Upon deactivation of the PWRGD signal 510, the system RESET signal 520 is subsequently activated. Normally, power is not immediately turned off after activation of the system RESET signal 520. Rather, it requires "y" milliseconds ("y" being a positive whole number, y>1 and sometimes around "4" as shown) until $V_{cc}$ 530 is decreased to a voltage level (e.g., 2 volts) that indicates to the SIO component that subsequent accesses to CMOS memory are to be prevented.

As a result, at time T2, conventional circuitry precludes CMOS memory from being accessed, allowing CMOS corruption from glitches and other phenomena between times T1 and T2. However, in accordance with the present invention, CMOS memory is precluded from being accessed generally at T1, being a moment in time just after deactivation of the $\overline{\text{PWRON}}$ signal 500, while still allowing other devices within the electronic system to be reset at T2.

Figure 6:
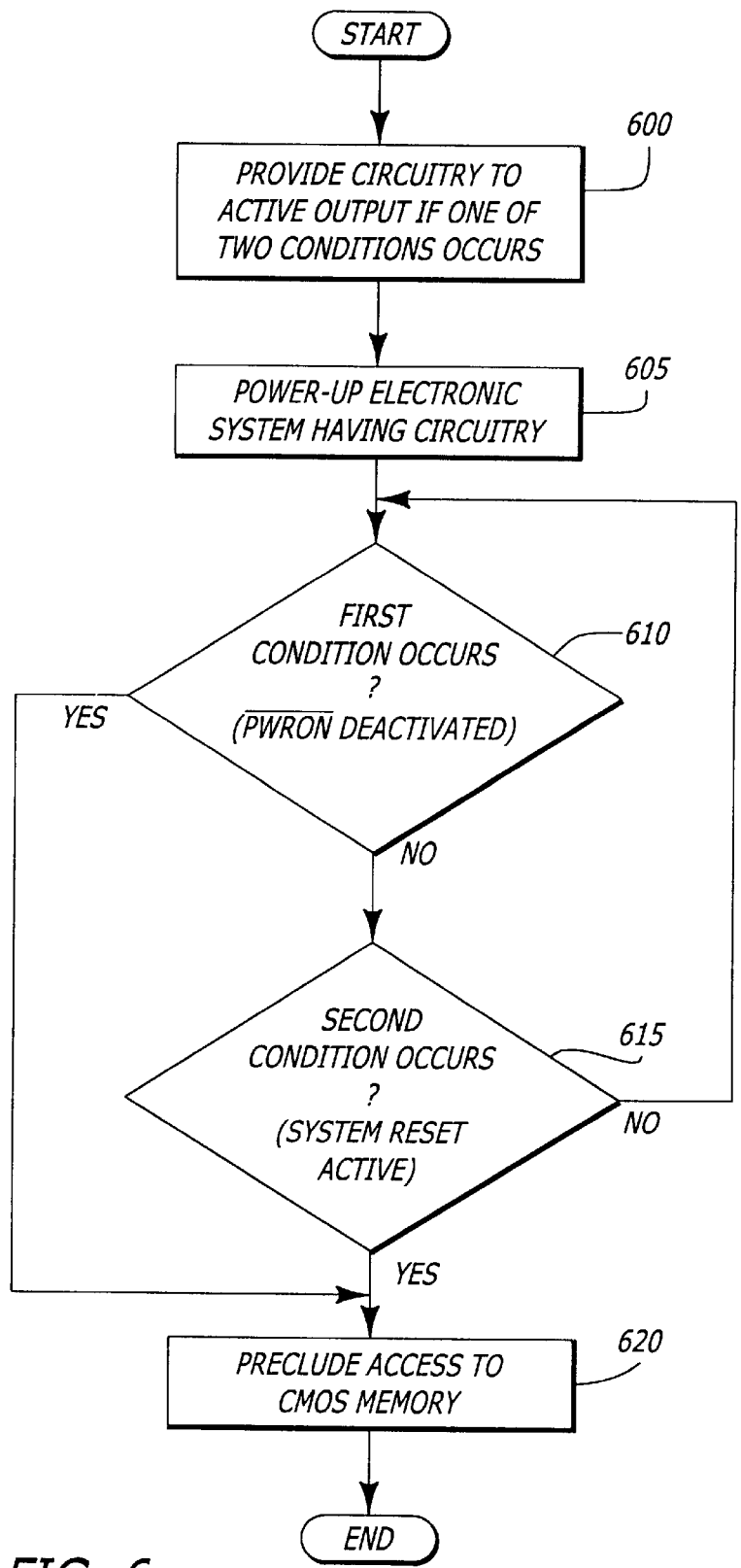
FIG. 6 is a flowchart illustrating the specific operations of the power-down mechanism of FIGS. 3–5.

Referring now to FIG. 6, a flowchart setting forth various operations required to avoid CMOS corruption is shown. First, circuitry is provided to activate an output signal if one of two conditions occurs; namely, deactivation of a $\overline{\text{PWRON}}$ signal indicating a power-down sequence is requested or activation of a system RESET signal indicating that no further activity is allowed in the electronic system (Step 600). The electronic system is powered-up (Step 605). Next, the circuitry monitors whether the $\overline{\text{PWRON}}$ signal has been deactivated (Step 610). If so, the component containing the CMOS memory is signaled to preclude further accesses to CMOS memory because the electronic system is being powered-down (Step 620). It is contemplated that the PWRGD signal will still protect the CMOS memory by activating the system RESET signal in a special case where the $\overline{\text{PWRON}}$ signal is not deactivated as shown in Step 615.

In certain applications it may be required to use a CMOS type device to implement logic gate 405. It may also be required to add resistance in the feedback line 425 such as a 10 kilo-ohm resistor.

The present invention described herein may be designed in accordance with a selected configuration. It is contemplated that other embodiments may come to mind to those skilled in the art without departing from the spirit and scope of the present invention. The invention should, therefore, be measured in terms of the claims which follow.

What is claimed is:

1. A reset circuit for preventing corruption of memory, comprising:
    an electrical component including the memory; and
    a logic gate coupled to the electrical component, said logic gate including an output and a plurality of inputs, said logic gate precluding access to the memory between (i) a first period of time when a first input of the plurality of inputs is to receive a control signal from the electronic component, the control signal initiating a power-down sequence, and (ii) a second period of time when an active system reset signal is to be received by the logic state.

2. The reset circuit according to claim 1, wherein the electrical component is a Super Input/Output component.

3. The reset circuit according to claim 1, wherein the logic gate is an OR gate.

4. The reset circuit according to claim 1, wherein the logic gate produces an active signal through the output to the electrical component if the first input of the logic gate receives the control signal initiating the power-down sequence.

5. The reset circuit according to claim 4 wherein the reset signal is used to preclude access to a plurality of components coupled to the reset circuit other than the electrical component.

6. The reset circuit according to claim 5, wherein the plurality of components include at least one of a card slot and an audio device.

7. The reset circuit according to claim 4, wherein the logic gate produces an active signal through the output to the electrical component if the second input of the logic gate receives a reset signal.

8. The reset circuit according to claim 1, wherein the electrical component produces the control signal upon receipt of a power-down command produced by execution of power management instructions by a processor.

9. The reset circuit according to claim 1, wherein the electrical component produces the control signal upon manual depression of a power on/off switch.

10. The reset circuit according to claim 1, wherein the memory is a volatile memory, the volatile memory including a memory fabricated through a Complimentary Metal-Oxide Semiconductor (CMOS) technology.

11. The reset circuit according to claim 1, wherein the control signal includes a Power On control signal in response to a power-down command from a processor.

12. A reset circuit for preventing corruption of a volatile memory implemented within an electronic system, the reset circuit comprising:
    component means for controlling access to the volatile memory containing system configuration information about the electronic system; and
    logic means for signaling the component means when a power-down sequence of the electronic system has been initiated to preclude further access to the volatile memory between a first period of time when the component means signals the logic means that the power-down sequence has been initiated and a second period of time when a system reset signal is received by the component means.

13. The reset circuit according to claim 12, wherein the component means includes a Super Input/Output component.

14. The reset circuit according to claim 13, wherein the logic means includes a dual-input OR gate including an output coupled to a memory reset input of the Super Input/Output component and a first input coupled to a first power supply interconnect line to receive a Power On control signal produced by the Super Input/Output component.

15. An electronic system comprising:
    a bridge element;
    a component including a volatile memory element; and
    a reset circuit coupled to the bridge element and the component, said reset circuit including
        a logic gate coupled to the component, the logic gate including an output and a plurality of inputs, the logic gate to signal the component to preclude access to the volatile memory element between a first period of time when a first input of the logic gate receives a control signal from the component indicating that a power-down sequence has been requested and a second period of time when an active system reset signal is received by the logic gate.

16. The electronic system according to claim 15, wherein the logic gate of the reset circuit includes an OR gate.

17. The electronic system according to claim 15, wherein the volatile memory element includes a Complimentary Metal-Oxide Semiconductor memory placed within a Super Input/Output component.

18. The electronic system according to claim 15 further comprising a power supply.

19. The electronic system according to claim 18, wherein the logic gate further signals the component to preclude access to the volatile memory element if a second input of the logic gate receives the system reset signal from the bridge element.

20. The electronic system according to claim 19, wherein the bridge element includes a PCI-to-Host controller.

21. The electronic system according to claim 19, wherein the bridge element includes a PCI-to-ISA controller.

22. An electronic system comprising:
    processor means for processing information;
    component means for controlling reading and writing of information into a volatile memory element; and
    reset circuit means for resetting the processor means and the component means between a first period of time when a first input of the reset circuit means receives a control signal from the component means indicating that a power-down sequence has been requested, and a second period of time when an active system reset signal is received by the reset circuit means.

23. The electronic system according to claim 22, wherein the reset circuit means resetting the processor means and the component means if a second input of the reset circuit means receives the active system reset signal.

24. The electronic system according to claim 22, wherein said component means includes a Super Input/Output component.

25. The electronic system according to claim 24, wherein said reset means includes a dual-input OR gate including an output coupled to a memory reset input of the Super Input/Output component and a first input coupled to a first power supply interconnect line to receive a Power On control signal produced by the Super Input/Output component.

26. A method for preventing access to a memory within a component during a power-down sequence, the method comprising:
    1) providing a deactivated first control signal by the component to indicate that a power-down sequence has been requested;
    2) monitoring whether the first control signal has been deactivated; and
    3) preventing access to the memory, within the component, for a predetermined period of time between a first period of time when the first control signal has been deactivated by the component and a second period of time when a second control signal is deactivated to produce a system reset signal.

27. The method according to claim 26, wherein concurrent with the monitoring of the control signal, the method further comprises
    monitoring whether the system reset signal has been activated in response to the second control signal; and
    preventing access to the memory if the system reset signal has been activated.

28. The method according to claim 27, wherein the memory is a volatile memory, the volatile memory including a memory fabricated through a Complimentary Metal-Oxide Semiconductor (CMOS) technology.

29. The method according to claim 26, wherein the component is a Super Input/Output component.

30. The method according to claim 26, wherein the second control signal is a Power Good signal from a power supply.

31. A method for preventing access to a component including a memory during a power-down sequence, the method comprising:
    providing a first control signal to indicate that a power-down sequence has been requested; and
    preventing access to the memory between a first period of time when the first control signal has been provided by the component and at least a second period of time when a system reset signal is provided to reset the memory.

32. The method according to claim 31, wherein the providing of the first control signal includes
    deactivating the first control signal to indicate commencement of the power-down sequence; and
    maintaining whether the first control sequence has been activated.

33. The method according to claim 32, wherein prior to preventing access to the memory, the method further comprises
    deactivating a second control signal by a power supply; and
    monitoring whether the second control signal has been activated.

34. The method according to claim 33, wherein the preventing of access to the memory comprises
    placing the memory in a reset state to prevent access when the first control signal is deactivated; and
    placing the memory in the reset state to prevent access when the second control signal from the power supply is deactivated, the deactivated second control signal to produce the system reset signal after a once predetermined delay from deactivation of the first control signal has expired.

* * * * *